United States Patent [19]
Kern et al.

[11] Patent Number: 5,865,448
[45] Date of Patent: Feb. 2, 1999

[54] INTEGRALLY MOLDED GATE SUPPORT ARRANGEMENT FOR PLASTIC SHOPPING CART BASKETS

[75] Inventors: Alan R. Kern, Richmond; Thomas Vineyard Hammack, Glen Allen; John A. LaFleur, Richmond, all of Va.

[73] Assignee: Rehrig International, Inc., Richmond, Va.

[21] Appl. No.: 574,459

[22] Filed: Dec. 15, 1995

[51] Int. Cl.⁶ ...................................................... B62B 3/02
[52] U.S. Cl. ................................ 280/33.992; 280/33.991
[58] Field of Search ......................... 280/33.991, 33.992, 280/33.993, 33.995, 33.996, 33.997, 47.34, 47.35, DIG. 4; 224/411

[56] References Cited

U.S. PATENT DOCUMENTS

| | | | |
|---|---|---|---|
| 2,812,187 | 11/1957 | Nicholl et al. ...................... | 280/33.995 |
| 3,083,791 | 4/1963 | Shoffner ............................. | 280/33.995 |
| 3,717,358 | 2/1973 | Mills . | |
| 4,046,394 | 9/1977 | Thompson, Jr. . | |
| 4,632,411 | 12/1986 | Badger ................................ | 280/33.991 |
| 5,613,696 | 3/1997 | De Luna ............................. | 280/33.991 |
| 5,794,952 | 8/1998 | Kern et al. .......................... | 280/33.991 |

FOREIGN PATENT DOCUMENTS

| | | | |
|---|---|---|---|
| 2418730 | 9/1979 | France ............................... | 280/33.995 |
| 2672560 | 8/1992 | France ............................... | 280/33.991 |
| 94022705 | 10/1994 | WIPO ................................ | 280/33.991 |

*Primary Examiner*—Paul N. Dickson
*Assistant Examiner*—Faye M. Fleming
*Attorney, Agent, or Firm*—Bacon & Thomas

[57] ABSTRACT

A plastic basket of a nestable shopping cart is integrally formed with support projections at upper inner edge portions of the side panels thereof at a position spaced rearward of a front panel. The support projections are adapted to support a pivoting rear gate member of a similarly constructed cart such that, when the two carts are nested, the rear gate panel abuts and is supported by the support projections in order to prevent the rear gate panel from dropping down into the plastic basket during cart nesting.

10 Claims, 6 Drawing Sheets

INTEGRALLY MOLDED GATE SUPPORT ARRANGEMENT FOR PLASTIC SHOPPING CART BASKETS

BACKGROUND OF THE INVENTION

1. Field of the Invention

The present invention pertains to nestable carts for use at supermarkets or the like and, more particularly, to a rear gate panel support arrangement for blocking a pivoting rear gate panel of one cart from dropping down into a plastic basket of another cart during cart nesting.

2. Discussion of the Prior Art

Nestable carts for use at supermarkets or the like are widely known in the art. In general, such carts each include a basket supported upon a metal frame wherein the basket is formed with a rear panel that is adapted to pivot upon being engaged by a front portion of another cart. With this arrangement, the front portion of one cart can become nested within the basket of the other cart. This enables numerous carts to be stored in a compact manner.

The baskets for such carts are either formed from metal wires or plastic. Forming the baskets from plastic has numerous advantages since, for example, the baskets can be made lighter for ease of maneuverability, the plastic will not rust or corrode, and the baskets are less likely to cause damage to vehicles in the parking lot of a store using such baskets. Unfortunately, as with other types of cart, carts made with plastic baskets suffer from the drawback that, when similarly constructed carts are nested, the pivoting rear panel of a forward cart can drop within the basket portion of a nested cart which makes unnesting the carts extremely difficult.

In the prior art, this problem has been solved in the plastic shopping cart art by providing stop brackets that are welded to a reinforcing ring that supports the plastic basket. These stop brackets extend about an upper edge of the plastic basket and project into the basket itself. Such a known arrangement is exemplified in FIG. 7 of the present application.

Although the presence of the stop brackets can function well to prevent the pivoting rear gate panel of the forward cart from dropping within the basket of a cart nested therewith, the connections between the stop brackets and the reinforcing ring have been known to fail over time mainly due to the fatigue loading placed thereon. In addition, assembly of the stop brackets to the reinforcing ring requires an additional manufacturing step, as well as the production of additional components. Obviously, these factors result in increased repair and manufacturing costs. Furthermore, these stop brackets can catch on articles and the like placed within the basket which is undesirable. Finally, these stop brackets are not aesthetically appealing.

Therefore, there exists a need in the art for a rear gate panel support arrangement for use on plastic, nestable carts which will not only function to prevent a pivoting rear gate of a forward cart from dropping into the plastic basket of a nested cart but which will be more economical to manufacture, more reliable and aesthetically appealing.

SUMMARY OF THE INVENTION

According to the present invention a nestable cart is provided that includes a basket made of plastic, such as polyethylene, wherein the basket is, at least partially, supported upon a frame by a reinforcing member and wherein the plastic basket is integrally formed with at least one gate support projection on an inner side wall of the basket at a position spaced from the front panel of the cart. The gate support projection is adapted to engage and support a rear gate panel of a similarly constructed cart such that, when the two carts are nested, the rear gate panel abuts the gate support projection and is prevented from dropping into the basket of the nested cart. Actually, opposed gate support projections are provided on the inner side walls of the plastic cart basket. In the preferred embodiment, the support projections taper from a position substantially flush with an upper ledge of the basket toward a bottom panel of the basket.

By this arrangement, the nestable carts are protected from becoming undesirably entangled when nested. In addition, by integrally forming the support projections with the basket side panels, substantial savings in both manufacturing costs and efficiency can be achieved. Furthermore, the support projection arrangement will be more reliable and aesthetically appealing than that associate with the prior art.

Additional features and advantages of the invention will become more readily apparent form the following detailed description of a preferred embodiment thereof when taken in conjunction with the following drawings wherein like reference numerals refer to corresponding parts in the several views.

DETAILED DESCRIPTION OF THE PREFERRED EMBODIMENT

Figure 1:
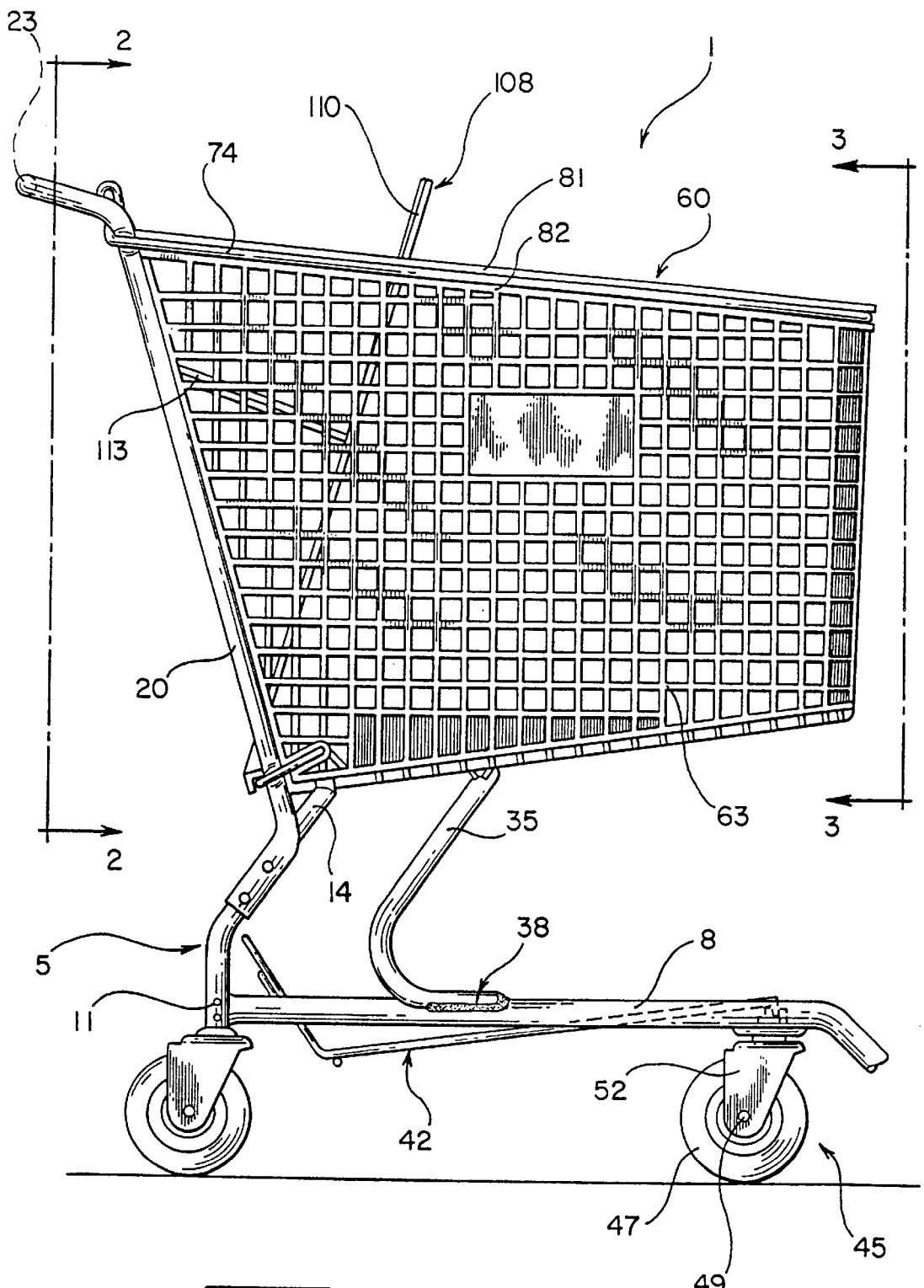
FIG. 1 is a side view of a grocery cart incorporating the gate support projections of the present invention.
Figure 2:
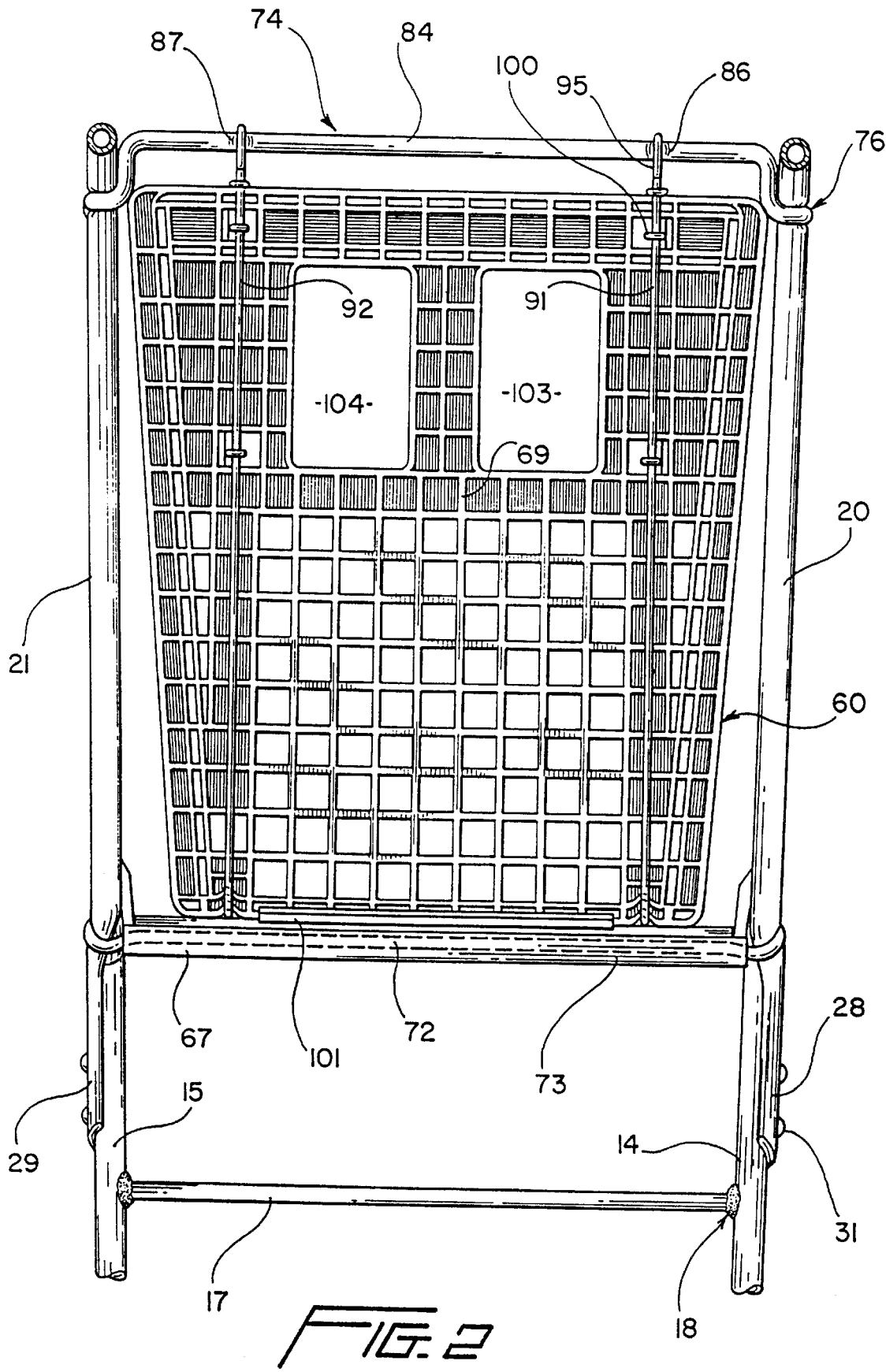
FIG. 2 is a sectional view taken through line 2—2 of FIG. 1.
Figure 3:
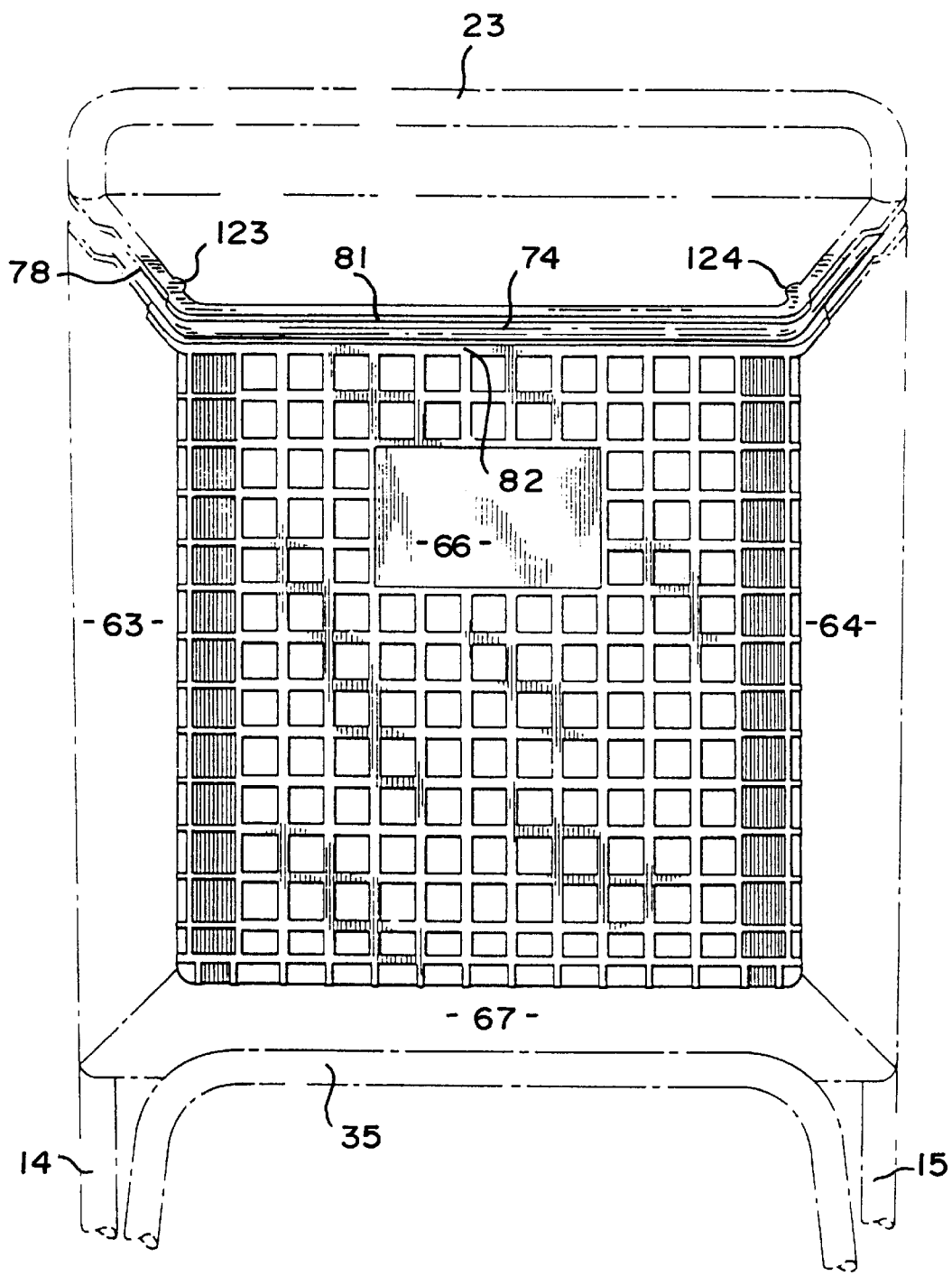
FIG. 3 is a front elevational view of the cart basket taken along line 3—3 of FIG. 1.

Initial reference is made to FIGS. 1–3 which depict a cart 1, generally of the type commonly used at supermarkets or the like, which incorporates the rear gate support arrangement of the present invention. Cart 2 is generally formed from a tubular frame 5 that includes a substantially U-shaped base 8 that is secured by rivets 11 to a pair of rear upstanding supports 14, 15. Rear upstanding supports 14, 15 are interconnected by a crossbar 17. Preferably, cross bar 17 is welded at its ends to rear upstanding supports 14 and 15 respectively such as indicated at 18 in FIG. 2. Frame 5 further includes a pair of upstanding posts 20, 21 that are preferably formed as a single unit and are interconnected by means of a transversely extending handle 23. Each upstanding post 20, 21 includes an associated clenched end 28, 29 which is fixedly secured to rear upstanding supports 14 and 15 respectively, preferably by a plurality of rivets 31. In addition, frame 5 includes an intermediate, upstanding support 35 as best shown in FIGS. 1 and 3. Intermediate, upstanding support 35 is secured at its respective ends to base 8 such as at weld location 38.

As is known in the art, cart 2 can further be provided with a lower platform 42 that is supported by base 8. Lower platform 42, for example, can be formed from a plurality of wires or from plastic. Frame 5 is supported by a plurality of casters 45. Preferably, four casters are provided, two forward and two in the rear. Each caster 45 comprises a wheel 47 that is rotatably mounted upon a generally horizontally extending axle 49 that, in turn, is supported by a U-shaped bracket 52. As is known in the art, each bracket 52 is adapted to pivot about a generally vertical axis such that casters 45 are permitted to swivel.

Cart 2 further includes a plastic basket 60. In the preferred embodiment, basket 60 is formed from polyethylene which is ideally suited to this application since polyethylene is relatively strong and panels manufactured therefrom are flexible enough to absorb some deformation, such as caused by impact, without breaking. However, it should be recognized that other polymer materials having similar properties can also be used. Basket 60 comprises two side panels 63 and 64, a front panel 66, a bottom panel 67 and a rear panel 69. Side panels 63, 64, front panel 66 and bottom panel 67 are preferably injection molded as a single, integral unit. On the other hand, rear panel 69 is formed as a separate piece and is adapted to pivot relative to the remainder of basket 60 in the manner which will be more fully described below. The entire basket 60 is preferably formed as an open lattice structure as is known in the art. Basket 60 is adapted to be supported by frame 5 and directly engages rear upstanding supports 14, 15 and intermediate, upstanding support 35. In addition, an attachment member 72, preferably in the form of a rod which is positioned below and forward of the rearmost end 73 of bottom panel 67, extends around upstanding posts 20, 21 and is attached to side panels 63 and 64.

The support arrangement for plastic basket 60 further includes a reinforcing member 74 that is preferably in the form of a ring that is welded to upstanding post 20 and 21 such as at 76 (see FIG. 2). Reinforcing member 74 extends within a channel 78 formed about the upper, outer periphery of plastic basket 60. Channel 78 is defined by generally horizontally extending and vertically spaced rim portions 81 and 82 of basket 60 and opens outwardly of basket 60. As best shown in FIG. 2, reinforcing member 74 includes a generally horizontally extending portion 84 that is positioned between upstanding posts 20, 21. Portion 84 of reinforcing member 74 includes two transversely spaced, crimped segments 86, 87 (see FIG. 2) which function to prevent a pair of support rods 91, 92 from shifting laterally outwardly of basket 60. More specifically, support rods 91 and 92 are each formed at their upper ends with a pivot loop 95 that extends about portion 84 of reinforcing member 74 adjacent to a respective crimped segment 86, 87. Support rods 91 and 92 are secured to rear panel 69 at the lower ends thereof and at various vertically spaced locations by means of connectors such as those indicated at 100. By means of this mounting arrangement of rear panel 69 with reinforcing member 74 by means of support rods 91 and 92 rear panel 69 is permitted to pivot relative to side panels 63, 64, front panel 66 and bottom panel 67 about an axis defined by portion 84 of reinforcing member 74.

As clearly shown in the drawings, rear panel 69 tapers downwardly and the entire basket 60 tapers forwardly. In addition, side panels 63 and 64 are located slightly, laterally outwardly of rear panel 69 and bottom panel 67 is arranged slightly below the lowermost portion of rear panel 69. By this arrangement, rear panel 69 is permitted to pivot, by means of the interconnections between support rods 91, 92 and portion 84 of reinforcing member 74, between side panels 63 and 64 in order to permit nesting of various carts 2 that are constructed in a similar manner. As is known in the art, this nesting occurs by pushing the front panel 66 of one cart 2 into the rear panel 69 of another cart 2 in order to cause pivoting of rear panel 69 such that both rear panel 69 and a front portion of the other cart extend within basket 60. When unnested, a stop member 101 (see FIG. 2), that projects upwardly from and is preferably integrally formed with bottom panel 67, limits the permitted rearward pivoting of rear panel 69. As discussed earlier in this application, when constructing nestable carts with plastic baskets, the pivoting rear panel of a forward cart could drop into the plastic basket of a nested cart which could interfere with the unnesting of the carts. Therefore, the gate support arrangement of the present invention, as will be described in detail below, is provided to block the rear gate panel of the forward nested cart from dropping down into the plastic basket of a cart nested therewith.

For the sake of completeness, it should be mentioned that cart 2 can also be provided with a pair of leg holes 103, 104 formed in rear panel 69 that are associated with a retractable seat assembly 108 in a manner known in the art. Retractable seat assembly 108 is generally formed from a back portion 110 and a seat portion 113. Since the structure and function of retractable seat assembly 108 is seen to be widely known in the art, this assembly will not be further discussed in detail herein.

Figure 4:
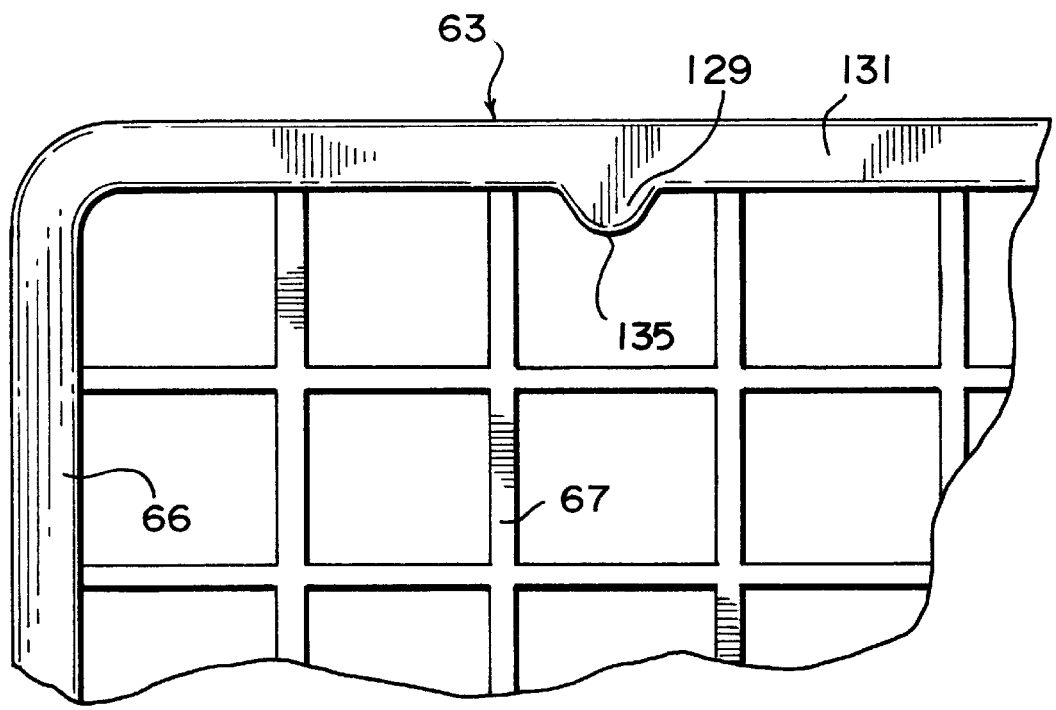
FIG. 4 is a top plan view of a front corner of the basket of FIG. 3.
Figure 5:
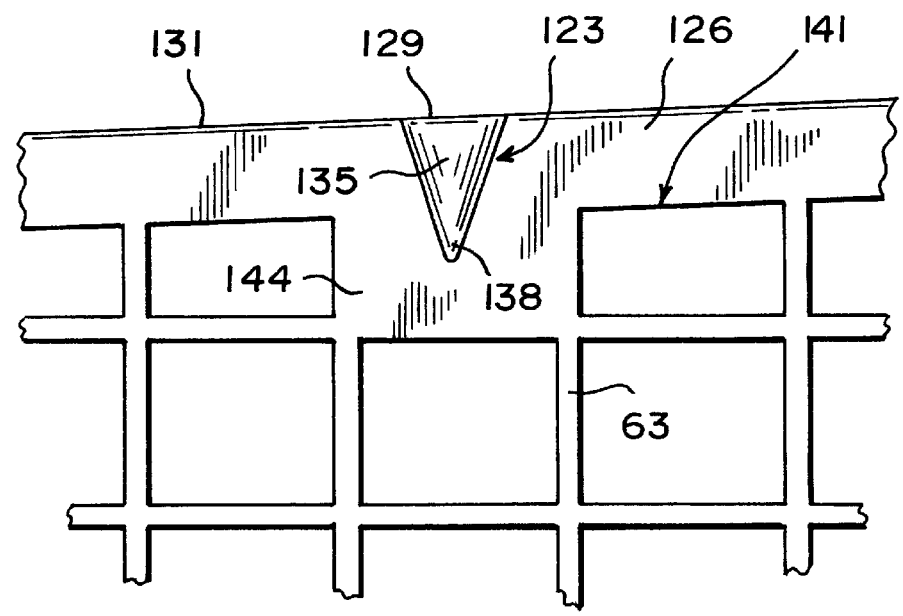
FIG. 5 is a side elevation view of the inner side of a side panel of the basket of FIG. 3.

Reference will now be particularly made to FIGS. 3–5 in describing the preferred embodiment of the gate support arrangement of the present invention. As stated above, this support arrangement is intended to prevent a pivoting rear gate panel of one cart from dropping down into a plastic basket of another similarly constructed cart during cart nesting. In the preferred embodiment, this gate supporting arrangement comprises a pair of support projections 123, 124 that are integrally formed with side panels 63 and 64 respectively. Since each of these support projections 123, 124 are similarly constructed, their construction will now be described in detail with reference to support projection 123. Support projections 123, as indicated above, is integrally formed with side panel 63 and extends laterally inwardly of side panel 63 towards side panels 64. More specifically, support projection 123 is integrally formed with an upper inner edge section 126 of side panel 63. Support projection 123 includes an upper surface 129 that is preferably flush with an uppermost peripheral surface 131 of side panel 63. Support projection 123 also preferably evinces an arcuate outer surface 135, extends from the uppermost peripheral surface 131 toward bottom panel 67 and terminates in a lowermost portion 138. As clearly shown in FIG. 5, support projection 123 tapers from upper surface 129 to lowermost portion 138. Due to this tapering arrangement and the presence of arcuate outer surface 135, support projection 123 is generally tear drop-shaped in side view as shown in FIG. 5.

As indicated above, the entire basket 60 is preferably formed as an open lattice structure. With this construction, side panel 63 defines an open latticework zone 141 into which support projection 123 extends. Actually, side panel 63 is preferably formed with a molded covering 144 that interrupts this open latticework and support projection 123 is formed on this molded covering 144 as best seen in FIG. 5.

Figure 6:
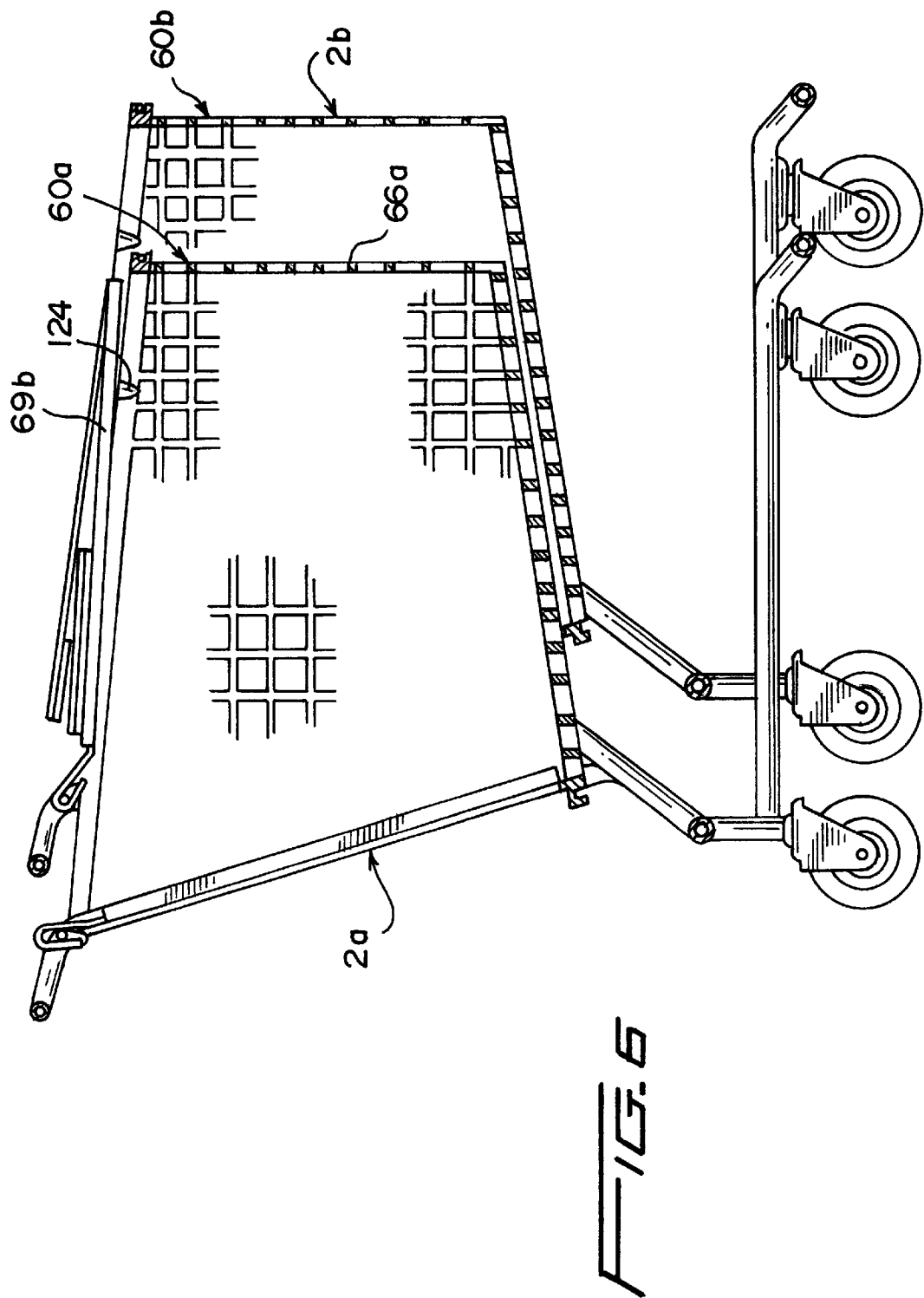
FIG. 6 is a partial cross-sectional side view illustrating two nested carts.
Figure 7:
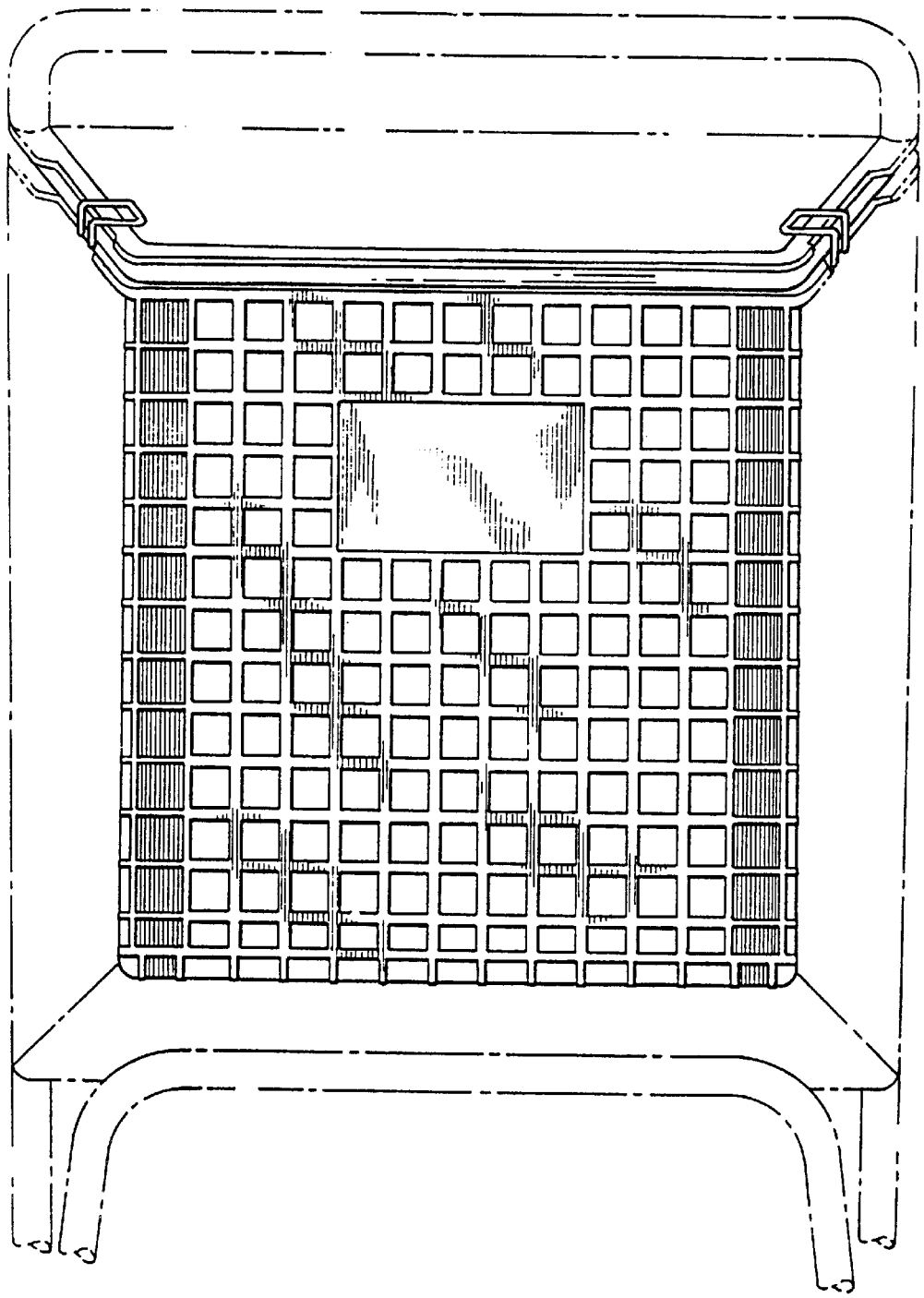
FIG. 7 is a front elevational view similar to that of FIG. 3 but depicting a known prior art gate support arrangement.

Reference will now be made to FIG. 6 in illustrating the manner in which support projections 123 and 124 function. As shown in FIG. 6, a first cart 2a is nested within a second cart 2b. When this nesting occurs, the front panel 66a of cart 2a engages the rear panel 69b of cart 2b to cause rear panel 69b to pivot upwardly to the position shown in FIG. 6. Until cart 2a is substantially fully nested within cart 2b, rear panel 69b will ride along a top portion of front panel 66a. However, given that the length of rear panel 69b is less than the full length of basket 60a of cart 2a, rear panel 69b will eventually slide off of front panel 66a during the nesting process. When this occurs, rear panel 69b could drop into basket 60a which would present an obstruction when it is desired to unnest carts 2a and 2b.

With the presence of projections 123 and 124, rear panel 69b is prevented from dropping into basket 60a. Instead, support projections 123 and 124 extend laterally inwardly of the respective side panels of basket 60a so that rear panel 69b will engage and ride upon upper surface 129 of each of the support projections 123 and 124. As clearly illustrated in FIG. 6, this arrangement will support gate panel 69b at a height slightly greater than the height of front panel 66a and therefore when unnesting of carts 2a and 2b occurs, rear panel 69b will readily extend over front panel 66a.

From the above description, it should be readily apparent that a cart 2 formed in accordance with the present invention will be permitted to readily nest and unnest with similarly constructed carts. By integrally forming the support projections 123 and 124 with the side panels 63 and 64 respectively, substantial savings in both manufacturing costs and efficiently can be achieved. In addition, the gate support arrangement is more reliable and aesthetically pleasing than the corresponding arrangements associated with the prior art.

Although described with respect to a preferred embodiment of the invention, it should be readily understood that various changes and/or modifications can be made to the invention as described without departing from the spirit thereof. In general, the invention is only intended to be limited by the scope of the following claims.

We claim:

1. A plastic basket for use on a nestable shopping cart comprising a bottom panel, a front upstanding panel, a pair of laterally spaced, upstanding side panels, and a rear gate panel, said bottom, front and side panels being fixedly secured together so as to constitute a unitary member, said rear gate panel including an upper portion and a lower portion, said rear gate panel being mounted, at the upper portion thereof, for pivotal movement relative to said front, bottom and side panels, between an in-use position wherein said rear gate panel assumes an upright posture and a nested position wherein said rear gate panel is pivoted towards said front panel, at least one of said side panels being formed, along an upper inner edge thereof and at a position spaced rearward of said front panel, with an integral unitary plastic support projection extending laterally inwardly towards the other of said side panels and downwardly from the upper edge of said at least one side panel towards the bottom panel for a distance extending only partially along the at least one side panel, said support projection being configured and located so as to block a rear gate panel of a similarly constructed basket associated with a nesting shopping cart from dropping down into said plastic basket during cart nesting; said at least one of said side panels including an uppermost peripheral surface and said support projection including an upper surface that is substantially flush with said uppermost peripheral surface of said at least one of said side panels; and said at least one side panel defining an open latticework zone below said uppermost peripheral surface, said support projection extending into said open latticework zone.

2. The plastic basket according to claim 1, wherein said support projection tapers from the upper surface thereof towards said bottom panel.

3. The plastic basket according to claim 2, wherein said support projection includes an arcuate outer surface.

4. The plastic basket according to claim 1, wherein said support projection includes an arcuate outer surface.

5. The plastic basket according to claim 1, further comprising two of said support projections each being integrally formed with a respective one of said side panels at diametrically opposed positions, said support projections being located closer to said front panel than said rear gate panel.

6. The plastic basket according to claim 1, further comprising two support projections each being integrally formed with a respective one of said side panels at diametrically opposed positions, each of said support projections being located so as to block a rear gate panel of a similarly constructed basket associated with a nesting shopping cart from dropping down inside said plastic basket during nesting.

7. A nestable shopping cart comprising:

a frame supported upon a plurality of wheels;

a plastic basket attached to said frame, said basket including a base panel, an upstanding front panel, laterally spaced upstanding side panels and a rear gate panel;

means for pivotally mounting an upper portion of said rear gate panel to one of said frame and said side panels so that said rear gate panel is movable between an upstanding position wherein said rear gate panel closes off a rear area of said basket and a nested position wherein said rear gate panel is forcibly pivoted towards said front panel by engagement with a similarly constructed cart; and a plastic support projection extending laterally inwardly from an upper inner edge of at least one of said side panels towards the other of said side panels, said support projection being integrally formed with said at least one of said side panels and extending downwardly from said upper inner edge of said ay least one of said side panels towards the bottom panel for a distance extending only partially along the at least one side panel, and being located on the side panel so as to block a rear gate panel of a basket of a similarly constructed shopping cart form dropping down into said plastic basket during cart nesting; at least the upstanding side panels of said plastic basket define an open latticework zone below said uppermost peripheral surface, said support projection extending into said open latticework zone.

8. The plastic basket according to claim 7, wherein said support projection tapers from an upper surface thereof towards said bottom panel.

9. The plastic basket according to claim 8, wherein said support projection includes an arcuate outer surface.

10. The plastic basket according to claim 8, wherein said support projection includes an arcuate outer surface.

* * * * *